US005623883A

United States Patent [19]

Davidson et al.

[11] Patent Number: 5,623,883

[45] Date of Patent: Apr. 29, 1997

[54] KILN FOR CALCINATION OF A POWDER

[75] Inventors: John F. Davidson, Cambridge; Kevan R. Reilly, Ingleby Barwick, both of England

[73] Assignee: Tioxide Group Services Limited, United Kingdom

[21] Appl. No.: 406,618

[22] Filed: Mar. 20, 1995

[30] Foreign Application Priority Data

Mar. 23, 1994 [GB] United Kingdom .................... 9405760

[51] Int. Cl.[6] .................................. B23K 3/02; B44B 7/02

[52] U.S. Cl. .......................... 110/226; 432/119; 110/246; 110/341

[58] Field of Search ..................................... 110/226, 246, 110/341; 432/118, 119, 106

[56] References Cited

U.S. PATENT DOCUMENTS

| | | |
|---|---|---|
| 2,261,403 | 11/1941 | Newhouse . |
| 4,136,965 | 1/1979 | Sunnergren et al. . |

FOREIGN PATENT DOCUMENTS

| | | |
|---|---|---|
| 203673 | 5/1924 | United Kingdom . |
| 395729 | 7/1933 | United Kingdom . |
| 959048 | 5/1964 | United Kingdom . |
| 1391489 | 4/1975 | United Kingdom . |

OTHER PUBLICATIONS

French Abstract, 2723740, Cousin et al Dec. 1979.
German Abstract, 3443933, Seelen Jun. 1986.

*Primary Examiner*—Henry A. Bennett
*Assistant Examiner*—Susanne C. Tinker

[57] ABSTRACT

An improved kiln for the calcination of a powder comprises a directly heated rotary kiln in which at least a part of the inner circumferential wall is equipped with a plurality of protrusions. The protrusions are shaped so that the powder is substantially not lifted during operation of the kiln. In a preferred embodiment the protrusions have the shape of a triangular prism and are positioned within the kiln so as to pass through the powder in the manner of a plough. Preferably the top face of the prism is an isosceles triangle in which the equal angles are greater than the angle of repose of the powder for which the kiln is designed.

13 Claims, 2 Drawing Sheets

KILN FOR CALCINATION OF A POWDER

Figure 1:
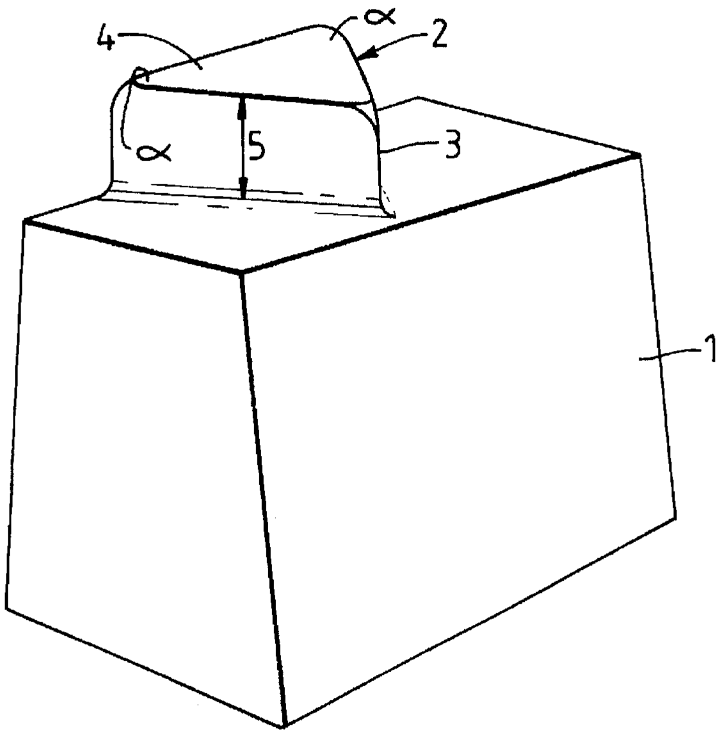

The invention relates to kilns suitable for the calcination of powders and in particular to kilns known as directly heated rotary kilns.

Directly heated rotary kilns employ a method of heat transfer in which solids are heated by direct contact with hot fluids, usually gases. Typically, the hot gases are the products of combustion of a hydrocarbon fuel which are caused to flow over the solids in the rotary kiln whilst the kiln is rotated about its axis usually slightly inclined to the horizontal.

The efficiency of heat transfer from the gas to the solid in these kilns is low because a relatively small pan of the surface area of the solid is exposed to the hot gases. The efficiency can be improved by equipping the internal wall of the kiln with flights which lift and shower the solids through the gas stream as it passes through the kiln. However, when the solid being calcined has a small particle size, for example when the solid is a pigment such as titanium dioxide, showering of the solid causes entrainment in the gas stream and significant losses unless the kiln is also equipped with a means for removal of the solids from the emerging gas stream.

An object of the current invention is to provide a kiln which has an improved heat transfer efficiency compared to known kilns and in which the loss of solids by entrainment is within acceptable limits.

According to the invention, a kiln for calcination of a powder comprises a directly heated rotary kiln in which at least a part of the inner circumferential wall of the kiln is equipped with a plurality of protrusions, the shape of said protrusions being such that said powder is substantially not lifted by the protrusions as a result of rotation of the kiln during use.

The surface area of the inner wall of the kiln according to the invention is greater than the surface area of the inner wall of a conventional kiln of similar overall dimensions but in which the inner wall has a smooth surface. In normal operation only a portion of the inner wall is in direct contact with the powder which is being calcined while the remaining portion of the inner wall is usually in contact with the hot gases. The wall area in contact with the gases is thereby heated and, after rotation of the kiln, comes into contact with the powder. Heat can then be transferred to the powder and, because of the increased surface area of the wall of the kiln of the invention compared to conventional kilns and also because of movement induced in the powder bed by the protrusions, this heat transfer process is more efficient than in known kilns. The protrusions also tend to produce turbulence in the gas stream which assists heat transfer to the inner wall and to the powder surface.

The protrusions which provide the increased surface area of the wall of the kiln can be of any suitable shape provided that they do not afford a means by which the powder is substantially lifted out of the bed of powder which is present in the kiln during use and thereby showered through the hot gas stream. For example, the protrusions can be in the form of segments of a sphere or can be needle-like or rod-like. However, the protrusions are preferably prismatic. This form provides a usefully high surface area and the prismatic shape can be relatively easily fabricated.

When prismatic protrusions are employed in the kiln of the invention they must be positioned such that they do not present a flat surface upon which powder can lodge as the protrusion emerges from the bed of powder during rotation of the kiln. In a preferred arrangement the prismatic protrusions effectively act as ploughs as they are caused to move through the bed of powder by the rotation of the kiln. This arrangement is described in more detail hereinafter with reference to the Figures.

The efficiency of heat transfer by means of the protrusions can be improved by ensuring that a bed of powder is present in the kiln during operation. Preferably this bed has a depth which ensures that the majority of the protrusions become totally immersed in the bed during some pan of each revolution. In some processes, such as the calcination of titanium dioxide pigments, it is advantageous to control the speed at which powder progresses through the kiln. The residence time in selected parts of the kiln can be controlled if a relatively deep bed of powder is formed by restricting the diameter of the kiln in one or more zones along the length of the kiln. A particularly preferred kiln according to the invention is equipped with protrusions as hereinbefore described and with zones of restricted diameter. Normally, one zone of restricted diameter will be close to the discharge end of the kiln but additional restrictions positioned in several zones along the length of the kiln provide a usefully deep bed of powder in a large proportion of the length of the kiln. These restrictions can be provided in any convenient way such as the inclusion of annular walls or dams within the kiln but preferably the kiln is restricted in such a manner that there is a free flow of the powder over the restriction.

The protrusions can be fitted to the kiln by any convenient means. For example, annular rings equipped with protrusions can be inserted into a kiln shell or a monolithic liner equipped with protrusions can be fitted within the kiln. However, rotary kilns are frequently lined with refractory bricks or blocks and a particularly convenient means of providing a kiln with the protrusions according to the invention comprises lining some or all of the kiln with refractory blocks, each block being equipped with one or more protrusions. Normally, a kiln is lined with a proportion of smooth-faced blocks and with a proportion of blocks equipped with one or more protrusions so as to form zones in which the inner wall of the kiln is smooth and zones in which protrusions are present. If desired, a zone can be lined with a mixture of smooth-faced blocks and blocks with protrusions.

The proportion of the kiln wall which is equipped with protrusions depends, to some extent, on the process for which the kiln is designed. Typically, a relatively wet filter cake or paste is fed to a rotary kiln for drying and/or heat treatment and the presence of protrusions in the kiln at the end at which this material is introduced will normally lead to build-up of solid on the inner wall of the kiln. Therefore the inner wall at this end of the kiln is usually smooth. After initial loss of moisture the powder becomes more flee-flowing and, in the zone where the powder is free-flowing, heat transfer by means of the protrusions is particularly efficient. Consequently, the kiln is normally equipped with protrusions in the zone or zones in which the powder is free flowing when the kiln is in use. Some calcination processes, for example in the preparation of titanium dioxide pigments, involve a period of residence in the kiln at a high temperature during which physical or chemical changes occur whilst heat is transferred from the gases to the powder (for example, in the conversion of anatase titanium dioxide to futile titanium dioxide). Frequently, a kiln designed for such a process is equipped with a smooth inner wall in the zone where the powder is maintained at this high temperature.

A typical kiln according to the invention and intended for use in the calcination of titanium dioxide for production of pigments is equipped with a smooth inner wall in the zone where damp filter cake is introduced and extending up to about 65% of the length of the kiln measured from the end of kiln at which material is charged and in a zone extending up 10% of the length of the kiln measured from the end of the kiln at which dry titanium dioxide is discharged. The inner wall between these two zones is equipped with protrusions and, typically, from 20 to 30% of the length of the kiln is so equipped.

The shape and size of the protrusions governs, to some extent, the number of protrusions provided per unit area. However, the space between neighbouring protrusions must be such that the powder is not lifted as a result of bridging of the powder in the space between protrusions.

The kiln according to the invention is suitable for use in a number of processes in which a solid is heated to remove water or to bring about a chemical or physical change. It can be used, for example, for roasting crushed ores, for chloridising silver ores, for the production of barium sulphide from barium sulphate, for the production of vermiculite and for drying a number of inorganic solids such as alumina, gypsum, clay and titanium dioxide. It is particularly useful in the preparation of titanium dioxide pigments in which a filter cake of hydrated titanium oxide precipitated from a titanium sulphate solution is dried and, usually, convened to the rutile crystal form by calcination in a rotary kiln.

Figure 2:
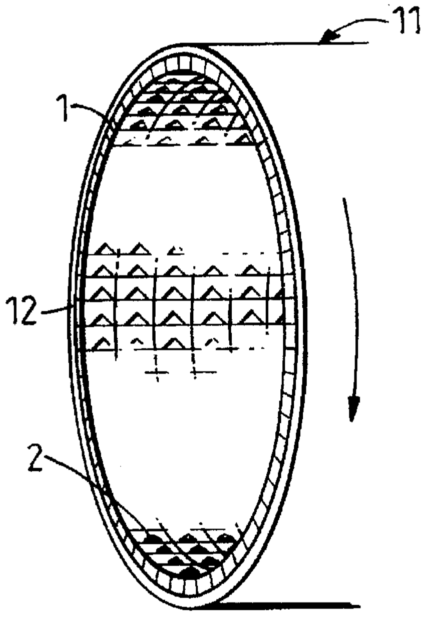

A particular example of the kiln of the invention is described below by reference to the Figures in which FIG. 1 is a view of a refractory block equipped with a prismatic protrusion, FIG. 2 is a cross-sectional view of part of a kiln according to the invention indicating the arrangement within the kiln of blocks similar to that shown in FIG. 1.

Figure 3:
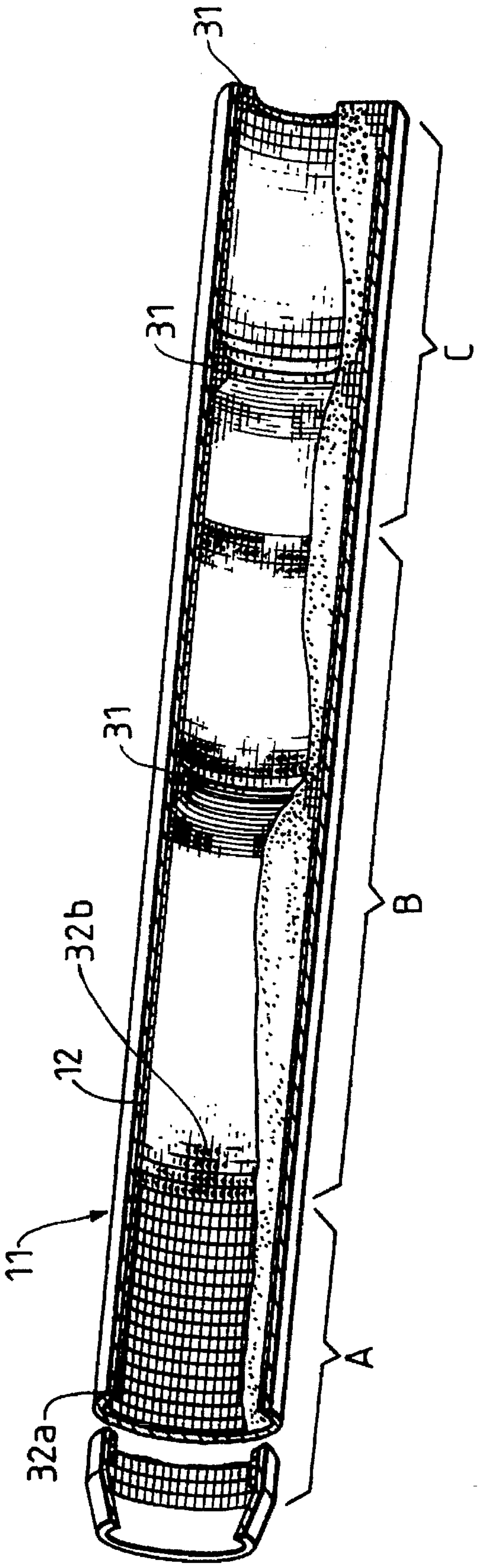

FIG. 3 is a part cut-away view of a kiln equipped with a block liner formed partly from smooth-faced blocks and partly from blocks as illustrated in FIG. 1.

Referring to FIG. 1, the main body I of the block is constructed from a refractory material such as is used in dense medium alumina firebricks and has a shape such that a number of the blocks can be formed into an annulus. The shape of the block is such that an appropriate number of blocks form a self-supporting arch although normally the blocks are also cemented into place within a metal shell of the rotary kiln. The block is equipped with a prismatic protrusion 2 and an assembly of the blocks of FIG. 1 within a kiln provides a kiln with a plurality of protrusions according to the invention.

The arrangement of blocks within the kiln is shown schematically in FIG. 2. The direction of rotation of the kiln 11 is indicated by the arrow in FIG. 2 and it can be seen that the blocks are arranged so that edge 3 of the prismatic protrusion (hereinafter called the leading edge) is the first part of the protrusion to emerge from the bed of powder lying on the bottom of the kiln as the kiln is rotated.

The prismatic protrusion 2 and in particular the triangular surface 4 is shaped such that the powder is not retained on the surfaces of the protrusion after the protrusion emerges from the powder bed during rotation of the furnace. When the triangular surface 4 is an isosceles triangle as shown, this can be achieved by ensuring that the angles $\alpha$ of the triangle not adjacent to the leading edge are greater than the angle of repose of the powder for which the kiln is to be used. The height 5 of the prismatic protrusion is such that the triangular surface 4 is completely covered with powder during a part of each revolution of the kiln.

The general arrangement of blocks 1 within the kiln 11 is shown in FIG. 2 from which it can be seen that the blocks are positioned within a steel shell 12 in an annular arrangement. The blocks are sealed by means of a refractory cement.

FIG. 3 illustrates a kiln 11 equipped with blocks as illustrated in FIG. 1 and also three zones in which the diameter of the kiln 11 has been restricted by fitting blocks in the form of a dam 31. The kiln is constructed from a substantially cylindrical steel shell 12 in which some smooth-faced blocks **32*a* and some blocks 32*b* fitted with protrusions as illustrated in FIG. 1 are annularly arranged and fixed with refractory cement. The dams 31** are constructed by an appropriate arrangement of smooth-faced blocks.

In use the kiln illustrated in FIG. 3 is rotated about its axis at a slight inclination to the horizontal. The illustrated kiln is particularly suitable for calcination of hydrous titanium oxide in the preparation of titanium dioxide pigments. The hydrous titanium oxide charged is relatively wet and is initially dried in Zone A equipped with smooth-faced blocks. In Zone B, where the kiln wall is equipped with blocks having a prismatic protrusion, the titanium dioxide is finally dried and raised to a temperature at which conversion of the anatase crystal form to the rutile crystal form takes place. In this zone efficient heat transfer is particularly important. The hot titanium dioxide is held at the highest temperature in the kiln for a period whilst conversion of anatase to rutile occurs, largely in Zone C where the wall of the kiln is fitted with smooth-faced blocks.

The Figures describe one illustration of the invention and many variations within the scope of the patent will be apparent to a skilled person.

The kiln according to the invention provides more efficient heat transfer than has been possible with conventional kilns, thereby improving throughput or reducing energy consumption in comparison to a conventional kiln of similar dimensions. Since the protrusions do not lift the powder out of the bed to any substantial extent the losses associated with entrainment of solid in the hot gas stream are not increased as a result of this improved heat transfer efficiency.

We claim:

1. A kiln for calcination of a powder comprising a directly heated rotary kiln having an inner circumferential wall, at least a part of said inner circumferential wall of the kiln being equipped with a plurality of protrusions having a shape of a triangular prism, the protrusions being arranged within the kiln with one triangular face of the prism parallel to the inner circumferential wall and with an edge formed by the intersection of two parallelogrammatic faces positioned to provide the first part of the protrusion to emerge from a bed of powder within the kiln when the kiln is rotated in use, the triangular face being an isosceles triangle in which the equal angles are greater than the angle of repose of said powder, such that said powder is not substantially lifted by the protrusions as a result of rotation of the kiln during use.

2. A kiln according to claim 1 in which the prismatic protrusion has a height such that the triangular face is completely covered by powder during a part of each revolution of the kiln when the kiln is in use.

3. A kiln according to claim 1 in which the diameter of the kiln is restricted in one or more zones along its length.

4. A kiln according to claim 1 which is provided with one or more annular rings equipped with protrusions or with a monolithic liner equipped with protrusions.

5. A kiln according to claim 1 which is lined with refractory blocks and at least some of the blocks which form a lining are equipped with one or more protrusions.

6. A kiln according to claim 5 in which the refractory blocks have a shape which enables a number of blocks to be assembled into a self-supporting arch.

7. A kiln according to claim 1 and designed to accept a wet filter cake as feed material, said kiln being provided with a smooth inner wall in a first zone where the feed material is introduced into the kiln and with an inner wall equipped with protrusions in a second zone where the feed material is free-flowing during use of the kiln.

8. A kiln according to claim 7 in which the inner wall is smooth in a third zone through which the feed material passes after passing through the second zone during operation of the kiln.

9. A kiln according to claim 8 in which the first zone has a length up to 65 per cent of the length of the kiln, the second zone has a length between 20 and 30 per cent of the length of the kiln and the third zone has a length up to 10 per cent of the length of the kiln.

10. A refractory block for use in a directly heated rotary kiln, said kiln for calcination of a powder, said block comprising a main body having a shape such that a number of said blocks can be colocated to form an annulus and one face of the main body is provided with at least one prismatic protrusion, in which the prismatic protrusion is a triangular prism having a face which is an isosceles triangle having equal angles of a magnitude greater than the angle of repose of said powder, said face provided with a protrusion being the face which forms the inner surface of the annulus when blocks are formed into an annulus.

11. A refractory block according to claim 10 constructed from dense alumina fire brick medium.

12. A method for calcining a powder comprising heating the powder in a directly heated rotary kiln, said kiln having an inner circumferential wall at least a part of which is equipped with a plurality of protrusions, having a shape of a triangular prism, said protrusions being arranged within the kiln with one triangular face of the prism parallel to the inner circumferential wall and with an edge formed by the intersection of two parallelogrammatic faces positioned to provide the first part of the protrusion to emerge from a bed of powder within the kiln when the kiln is rotated in use, the triangular face being an isosceles triangle in which the equal angles are greater than the angle of repose of said powder, such that said powder is not substantially lifted by the protrusions as the kiln is rotated.

13. A method according to claim 12 in which the powder is hydrous titanium oxide.

* * * * *